Patented June 1, 1954

2,680,100

UNITED STATES PATENT OFFICE 2,680,100

MANUFACTURE OF SILICA-MAGNESIA CATALYST

Jacob Elston Ahlberg and Leon L. Baral, Baltimore, and Thomas O. Tongue, Curtis Bay, Md., assignors to The Davison Chemical Corporation, Baltimore, Md., a corporation of Maryland No Drawing. Application March 6, 1951,
Serial No. 214,196

13 Claims. (Cl. 252—451)

The present invention is concerned with a process for the preparation of improved catalysts. It more specifically relates to the preparation of a silica-magnesia catalyst having superior physical and catalytic characteristics for the cracking of petroleum oils.

This application is a continuation-in-part of application Serial No. 70,902, filed January 14, 1949, now abandoned.

It is known in the art that synthetic porous solids, comprising silica and one or more metallic oxides, have catalytic properties in the treatment of petroleum oils. In the cracking of these mineral oils, the catalytic properties will depend upon the particular metallic oxide or oxides incorporated with the silica, the method of treatment during incorporation, as well as the quantity incorporated. During the cracking reaction, carbon is deposited upon the catalyst and must be removed at regular intervals by steaming the catalyst to strip the catalyst of hydrocarbons and burning the carbon residue from its surface. During the cracking reaction and subsequent regeneration, the catalyst is subjected to extremely high temperatures causing changes which seriously impair the activity of the catalyst. The steaming of the catalyst to strip the hydrocarbons before regeneration is even more detrimental to the activity of the catalyst than the high temperature encountered during the cracking and regeneration.

In addition to high catalytic activity and thermal and steam stability, the catalysts should be physically strong, hard, and resistant to attrition. In fluid catalytic processes, particularly, the catalyst particles are subject to extreme turbulence and friction which cause attrition of the catalytic particles to form fines which are lost from the system during regeneration of the catalyst. The fines lost must be replaced with new catalyst as the catalyst is recycled for further cracking of the hydrocarbons. Even though the percent of fines lost during each regeneration cycle may be relatively small, the extremely large scale of operations in the catalytic cracking of hydrocarbons and the relatively high cost of the catalysts makes extremely large savings in the cost of silica-magnesia catalysts possible by reduction in the loss of fines through improvement of the attrition resistance of the catalysts.

One general class of synthetic catalyst masses consists of silica and alumina with or without the addition of a third component such as zirconia or the like. These materials are characterized by the production of relatively large amounts of olefinic and isoparaffinic hydrocarbon having molecular weights of 28 to 58 or higher and are capable of producing naphthas in the gasoline boiling range which contains appreciable quantities of mono and polycyclic aromatic hydrocarbons.

Another general classification of synthetic contact masses comprises silica and magnesia as the major oxides with or without the addition of a third component such as alumina. In comparison with the silica-alumina catalyst in the first classification, cracking of hydrocarbons with silica-magnesia type catalyst produces smaller quantities of hydrocarbons having molecular weights below 58 and a substantial increase in hydrocarbons having desirable octane qualities boiling in the range of 100° F. to 450° F. Furthermore, the silica-magnesia catalysts have increased steam and thermal stability over the silica-alumina catalyst. It is apparent that the silica-magnesia catalysts are more suited for refining operations producing high quality motor gasolines, provided the masses can be prepared to possess the required activity, thermal stability, and attrition resistant characteristics.

Heretofore, silica-magnesia catalysts have been prepared by various procedures. One method employed is to prepare a washed silica hydrogel and incorporate powdered magnesia with this hydrogel by a mulling procedure followed by drying and activating in the conventional manner. Silica-magnesia catalysts have also been prepared by impregnating washed silica hydrogel with a magnesium salt solution and precipitating magnesia in the silica hydrogel by the action of a volatile base such as ammonia, washing free of soluble salts, and then drying and activating. Furthermore, it is known in the art, as shown by U. S. Patents Nos. 2,470,410 and 2,470,411, that aging silica-magnesia catalysts made by both methods at elevated temperatures in the presence of water before any drying will increase the thermal and steam stability just as this procedure does for silica-alumina catalyst. Unfortunately, the improvement in steam and thermal stability arising upon the treatment of the mulled hydrogel with hot water is accompanied with a serious loss in the attrition resistance of the catalysts.

It is an object of this invention to provide an improved silica-magnesia catalyst characterized by an increased thermal and steam stability.

It is also an object of this invention to provide a catalyst with improved resistance to attrition.

Another object of this invention is to provide a novel method of treating a silica-magnesia catalyst to improve its thermal and steam stability without adversely affecting its attrition resistance.

These and other objects are accomplished by this invention, which comprises the treating of a silica-magnesia gel in the presence of water at elevated temperatures for extended periods after the gel has been dried to an irreversible state.

Examples of the silica-magnesia gels which may be treated according to this invention are those prepared by the mulling processes of Patents Nos. 2,470,410 and 2,470,411, or by the precipitation of magnesia in silica gels with ammonia in the manner described. These silica-magnesia gels will show improvement in their steam stability and physical properties if treated according to this invention. Preferably, however, the silica-magnesia gel for treatment with hot water after drying or activation according to this invention is prepared by mixing a solution of sodium silicate and sulfuric acid to form a hydrosol which is immediately mixed with a slurry of magnesia and allowed to gel, or by mixing a solution of sodium silicate with a slurry of magnesia and then neutralizing the resultant slurry with sulfuric acid. The preferred methods of preparing silica-magnesia gel are described in applications Serial Nos. 659,674 of James N. Pryor filed April 5, 1946, now abandoned, and No. 659,675 filed April 5, 1946, which issued August 28, 1951, as Patent No. 2,565,627. The advantages of this invention are obtained when the silica-magnesia gel for the catalyst is prepared by any conventional process.

The silica-magnesia catalyst may vary widely in composition. In general, the amount of silica varies from 50 to 95% by weight as compared to 50 to 5% magnesia by weight. However, the preferred range is from 65 to 78% silica and 22 to 35% magnesia.

In the method of this invention, the silica-magnesia hydrogel formed by any one of the known methods is treated with water in the liquid state at an elevated temperature for an extended period. The temperature employed may range from 100° F. to 212° F. The length of treatment will vary depending upon the temperature of the treatment, and will range from approximately 6 to 18 hours. For example, if treated at 125° F., the treatment should be continued for a period of 18 hours. If the temperature of the treatment is increased to 212° F., the length of the treating operation may be reduced to 6 hours. However, best results are produced when the catalyst is aged for about 15 to 18 hours at any temperature within the range defined.

As a specific example illustrating the method of preparing a silica-magnesia hydrogel, a silica-magnesia catalyst containing approximately 72% SiO₂ and 28% MgO was made by mixing a sodium silicate solution having a 3¼:1 silica: soda ratio and a specific gravity of 28° Bé. at 60° F., at a temperature of 105° F. in a mixing nozzle with sulfuric acid, having a specific gravity of 30° Bé. at 60° F. at 125° F. to form a silica hydrosol having a normal excess acidity of .75 N. This silica hydrosol was then pumped through a second mixing nozzle together with a slurry containing 20.7% MgO at 110° F., and having a density of 1.223 at 80° F., at a rate of about 7.32 gallons per per minute of hydrosol to 1.68 gallons per minute of magnesia slurry.

The stream discharged from the nozzle was fed into setting tubs and allowed to remain there for a sufficient time to effect gelation. After gelation had been completed, the hydrogel was removed from the tubs, broken into fragments and washed with a wash water having a pH of 7 to 8 to remove the soluble reaction products. This washed gel was then dried at a temperature of about 350° F. to a moisture content sufficiently low to produce an irreversible gel, which may be from 5 to as high as 50°. Ordinarily the gel is dried at 170° F. for 15 hours to a TV of approximately 15%, and then activated at a temperature of about 1250° F.

The dried silica-magnesia gel was treated with hot water at 170° F. for 15 hours, re-dried, and then activated at a temperature of 1250° F. The resultant silica-magnesia catalyst was found to have a thermal and steam stability far superior to untreated catalyst and an improved attrition resistance.

The steam stabilities of a catalyst are determined by treating the catalyst for 24 hours at 1050° F. with steam at a pressure of sixty pounds per square inch gauge. After the steam treatment, the catalyst is tested for activity by passing a hydrocarbon feed stock at a given rate over the catalyst at 850° F. The activity of the catalyst is determined by the conversion of the feed stock which is measured and reported by the percentage of hydrocarbons in the product boiling below 400° F.

The thermal stability of the catalyst is determined by calcining the catalyst for three hours at 1350° F. The calcined catalyst is then tested for activity by passing a hydrocarbon feed stock in contact with the catalyst at a fixed rate at 850° F., and determining the percentage of hydrocarbons in the resulting product boiling below 400° F. Results of tests of the thermal and steam stability of the catalyst prepared by the specific example above and one prepared identically with it but without the hot aging treatment, are set forth in the following table in which the catalyst prepared according to this invention is identified as "treated."

|  | Thermal Stability | Steam Stability |
| --- | --- | --- |
| Treated | 47.2 | 43.5 |
| Untreated | 35.1 | 33.4 |

These improved benefits are obtained even by hot aging of silica-magnesia catalyst after activation. For example, a silica-magnesia catalyst prepared by a different method was activated for three hours at 1350° F. and then hot aged at 200° F. for 16 hours. The improvement in thermal and steam stability is shown in the following table:

|  | Thermal Stability | Steam Stability |
| --- | --- | --- |
| Treated | 46.2 | 39.5 |
| Untreated | 40.6 | 29.6 |

While the examples proposed are illustrative of the hot aging and dried hydrogel, it has been found that the same material benefits are obtained by the hot aging of an unwashed hydrogel still containing most of its salts which has been dried below the point of irreversibility. For example, one may add a slurry of magnesia to acid silica hydrosol, permit gelation to occur, separate this hydrogel from its mother liquor, slurry it in water, and spray dry this to form microspheres containing about 5% moisture. These are then hot aged followed by conventional washing, drying and activation.

The improvements in thermal and steam stability, resulting from the present invention are not accompanied with the decrease in attrition resistance experienced when silica-magnesia catalysts are aged according to methods heretofore available. For example, silica-magnesia catalysts of 72% $SiO_2$ and 28% $MgO$ were prepared by forming a washed silica hydrogel and then mulling with magnesia as disclosed by U. S. Patents Nos. 2,470,410 and 2,470,411. A catalyst prepared by drying and activating a gel formed by such a mulling procedure without aging in the presence of water is characterized by an unusual hardness and attrition resistance, but is impaired by a low steam and thermal stability. This mixture was then divided into four parts of which one was merely dried and activated as a blank, one was hot aged before drying, one hot aged after drying, and the last hot aged after activation for 3 hours at 1000° F. The hot aging procedure was to treat the catalyst with water at 200° F. for approximately 16 hours. All of the samples were activated at 1000° F. for 3 hours after hot aging.

Each of the samples of catalyst was tested for attrition resistance after the activation by a standard test, known as the roller test, in which a sample of catalyst is attrited by a blast of air for a specified length of time under narrowly defined conditions. A size analysis of the catalyst is made before and after the attrition to determine the increase in the fraction of catalyst having a particle size between 0 and 20 microns. The attrition index is the percentage increase in 0 to 20 micron material and is determined according to the following formula:

$$\text{Attrition index} = 100 \times \frac{\%0\text{--}20 \text{ material after attrition} - \%0\text{--}20 \text{ material before attrition}}{\%+20 \text{ material originally present}}$$

The results of the tests for resistance to attrition are presented in the following table:

| Method of Preparing Sample | Attrition Index |
|---|---|
| No hot aging | 3.7 |
| Hot aging after drying | 4.3 |
| Hot aging after activation | 4.0 |
| Hot aging before drying | 8.8 |

The treatment of silica-magnesia gels with hot water for periods ranging up to 18 hours, after the gel has been dried to an irreversible condition, produces a catalyst having a resistance to attrition approximately the same as the very hard catalysts prepared by mulling a silica-hydrogel with magnesia which have not been hot aged. The thermal and steam stability of the catalyst prepared according to this invention is greatly improved over the mulled catalyst which has had no hot water treatment. The catalyst of this invention will result in a loss of catalyst as a result of degeneration to fines by attrition of only about 50% of the loss of those catalysts prepared by the heat treating processes heretofore available.

We claim:

1. A method of preparing a silica-magnesia catalyst comprising forming a silica-magnesia hydrogel, washing and then drying the hydrogel to form an irreversible gel, treating the dried gel with water at about 100° F. to 212° F. for a period of about 6 to 18 hours, redrying and then activating the treated gel.

2. A method of manufacturing silica-magnesia catalysts comprising forming a silica-magnesia hydrosol, gelling the hydrosol to form a hydrogel, washing the hydrogel to remove soluble salts therefrom, drying the washed hydrogel to form an irreversible gel, heat treating the previously dried gel with liquid water for a period of 6 to 18 hours at a temperature from about 100° F. to 212° F., and drying and activating the thus heat treated catalyst.

3. A method of manufacturing silica-magnesia catalysts comprising mixing solutions of sodium silicate, sulfuric acid and a slurry of magnesia to form a silica-magnesia hydrosol, gelling the hydrosol to form a silica-magnesia hydrogel, washing soluble salts from the hydrogel, drying the washed hydrogel to an irreversible gel, treating the gel subsequently to drying with liquid water at temperatures ranging from about 100° F. to 212° F. for a period of about 6 to 18 hours, and drying the thus treated gel.

4. A method of preparing a silica-magnesia catalyst which comprises forming a silica-magnesia hydrogel, drying said hydrogel to form an irreversible gel, and treating the dried gel with liquid water at about 100° F. to 212° F. for a period of about 6 to 18 hours.

5. A method of preparing a silica-magnesia catalyst which comprises forming a silica-magnesia hydrogel, washing and drying said hydrogel to form an irreversible gel, and treating the dried gel with liquid water at about 100° F. to 212° F. for a period of about 6 to 18 hours.

6. A method of preparing a silica-magnesia catalyst which comprises forming a silica-magnesia hydrogel, washing the silica-magnesia hydrogel to remove soluble salts therefrom, drying the hydrogel to form an irreversible gel, heat treating the gel subsequent to drying with liquid water at 100°–212° F., and then activating the treated catalyst.

7. A method of manufacturing silica-magnesia catalyst which comprises forming silica-magnesia hydrogel, drying the hydrogel to an irreversible gel, heat treating the gel with liquid water at about 100° F.–212° F. for a period of about 6 to 18 hours, and then activating the treated catalyst.

8. In a method of manufacturing a silica-magnesia catalyst in which a silica-magnesia hydrogel is formed, washed, dried to an irreversible gel and activated, the improvement comprising treating the silica-magnesia gel with liquid water at about 100° F. to 212° F. for a period of about 6 to 18 hours after the drying of the hydrogel whereby the thermal and steam stability of the catalyst are increased and a catalyst resistant to attrition is formed.

9. A method of manufacturing silica-magnesia catalysts comprising forming a silica-magnesia hydrogel, washing the silica-magnesia hydrogel to remove soluble salts therefrom, drying the hydrogel to form an irreversible gel, activating the gel, and then heat treating the activated gel with liquid water at about 100° F. to 212° F. for a period of about 6 to 18 hours to improve the thermal and steam stability and attrition resistance of the catalyst, and again activating the heat treated catalyst.

10. In a method of manufacturing silica-magnesia catalysts, the improvement comprising heat treating a previously activated silica-magnesia catalyst in the presence of liquid water at about 100° F. to 212° F. for a period of about 6 to 18 hours whereby a catalyst of increased steam and thermal stability and resistance to attrition is formed.

11. A method of manufacturing a silica-magnesia catalyst comprising forming a slurry of silica-magnesia hydrogel, draining the mother liquor from the slurry, drying the hydrogel to irreversibility, heat treating the dried gel with liquid water at about 100° F. to 212° F. for a period of about 6 to 18 hours, washing salts from the heat treated gel, and drying and activating the washed gel.

12. A method of manufacturing silica-magnesia catalysts comprising forming a silica-magnesia hydrogel, washing the silica-magnesia hydrogel to remove soluble salts therefrom, drying the hydrogel to form an irreversible gel, activating the gel, and then heat treating the activated gel with liquid water at about 200° F. for about 16 hours to improve the thermal and heat stability and attrition resistance of the catalyst, and again activating the heat treated catalyst.

13. A method of preparing a silica-magnesia catalyst which comprises forming a silica-magnesia hydrogel, washing and drying said hydrogel to form an irreversible gel, and treating the dried gel with liquid water at about 170° F. for about 15 hours.

References Cited in the file of this patent

UNITED STATES PATENTS

| Number | Name | Date |
| --- | --- | --- |
| 1,900,859 | Connolly | Mar. 7, 1933 |
| 2,319,185 | Crowley | May 11, 1943 |
| 2,378,155 | Newsome et al. | June 12, 1945 |
| 2,456,721 | Milliken et al. | Dec. 21, 1948 |
| 2,565,627 | Pryor | Aug. 28, 1951 |
| 2,570,063 | Kimberlin | Oct. 2, 1951 |